UNITED STATES PATENT OFFICE.

OSCAR GÜNTHER AND LEOPOLD HESSE, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYESTUFF.

989,000. Specification of Letters Patent. Patented Apr. 11, 1911.

No Drawing. Application filed September 20, 1910. Serial No. 582,821.

*To all whom it may concern:*

Be it known that we, OSCAR GÜNTHER and LEOPOLD HESSE, residing at Elberfeld, and ARTHUR ZART, residing at Vohwinkel, near Elberfeld, Germany, doctors of philosophy, chemists, citizens of the German Empire, have invented new and useful Improvements in New Black Azo Dye, of which the following is a specification.

Our invention relates to the preparation of a new azo dyestuff which is obtained by combining the diazo compound of 2.4-dinitranilin in acid solution with 2-amino-8-naphthol-6-sulfonic acid.

The new dyestuff is after being dried and pulverized in the shape of its sodium salt a dark powder soluble in concentrated sulfuric acid with a yellowish-red color. Upon treatment with stannous chlorid and hydrochloric acid the dye is split up, 1.2.4-triaminobenzene and 1.2-diamino-8-naphthol-6-sulfonic acid result. It is an acid dyeing color, producing on wool very level bluish-black shades of good fastness to fulling and to light and distinguished by their good resistance to the action of boiling mineral acids.

In order to illustrate the new process more fully we can proceed as follows, the parts being by weight:—183 parts of 2.4-dinitranilin are diazotized with nitrosylsulfuric acid as described in British Letters Patent No. 6197/1894. The diazo compound is diluted with ice and added at about 0° C. to a suspension of 239 parts of the 2-amino-8-naphthol-6-sulfonic acid in water. The combination is complete after a short time and the dye is then filtered off and dried.

The formation of the new body is probably best illustrated by the following equation:

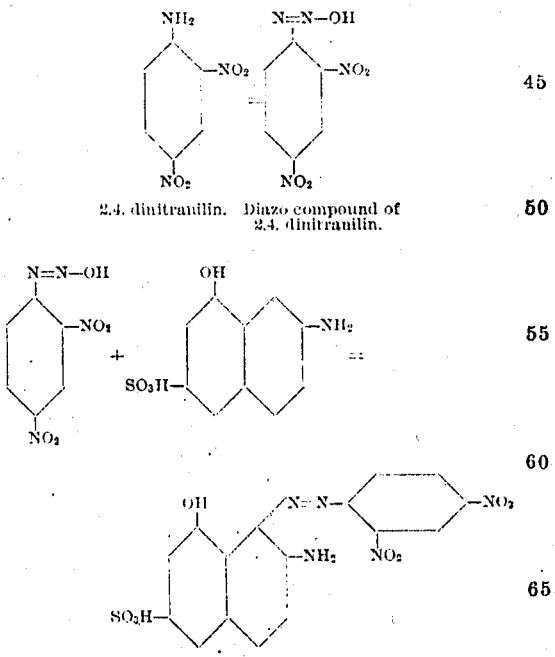

We claim:—

The herein-described new azo dyestuff obtainable by reacting with the diazo compound of 2.4-dinitranilin in acid solution upon 2-amino-8-naphthol-6-sulfonic acid, which is after being dried and pulverized in the shape of its sodium salt a dark powder soluble in concentrated sulfuric acid with a yellowish-red color; yielding upon reduction with stannous chlorid and hydrochloric acid 1.2.4-triaminobenzene and 1.2-diamino-8-naphthol-6-sulfonic acid; producing on
5 wool level bluish-black shades fast to fulling, to light and to the action of boiling mineral acids, substantially as described.

In testimony whereof we have hereunto set our hands in the presence of two subscribing witnesses.

OSCAR GÜNTHER. [L. S.]
  LEOPOLD HESSE. [L. S.]
  ARTHUR ZART. [L. S.]

Witnesses:
  CHAS. J. WRIGHT,
  ALFRED HENKEL.